(No Model.)
S. FARBAKY & S. SCHENEK.
THE MANUFACTURE OF SECONDARY BATTERIES OR ACCUMULATORS.
No. 348,625. Patented Sept. 7, 1886.
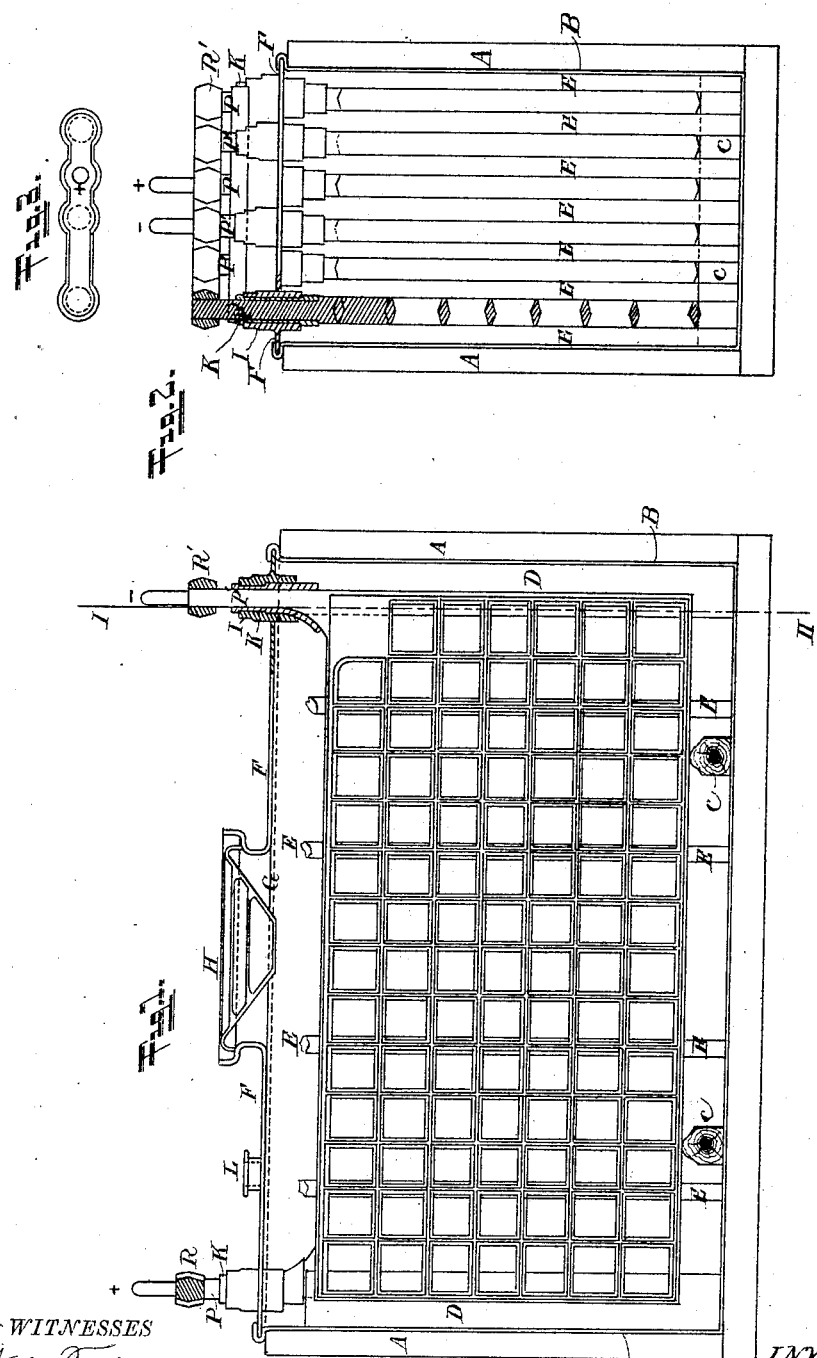

UNITED STATES PATENT OFFICE.

STEPHAN FARBAKY AND STEFAN SCHENEK, OF SCHEMNITZ, AUSTRIA-HUNGARY.

MANUFACTURE OF SECONDARY BATTERIES OR ACCUMULATORS.

SPECIFICATION forming part of Letters Patent No. 348,625, dated September 7, 1886.

Application filed June 7, 1886. Serial No. 204,395. (No model.) Patented in Belgium November 9, 1885, No. 70,789; in Italy November 9, 1885, XXXVII, No. 458, and in France November 12, 1885, No. 172,241.

*To all whom it may concern:*

Be it known that we, STEPHAN FARBAKY and STEFAN SCHENEK, both professors at the mining academy at Schemnitz, Austria-Hungary, have invented certain new and useful Improvements in the Manufacture of Secondary Batteries or Accumulators, of which the following is a specification.

The object of the present invention consists in the manufacture of secondary batteries or accumulators, and in the manner of fixing the active material in the interstices of the lead plates without any high pressure used until now for that purpose.

In manufacturing our secondary batteries we use, preferably, as active material for the negative pole-plates, a mixture of about ninety-five parts, of weight, of pulverized litharge, (free of copper,) and of five parts, of weight, of granulated pumice-stone or of brick-dust, or other neutral substances treated with diluted sulphuric acid, and for the positive pole-plates we use a mixture of about ninety-five parts, of weight, of litharge, ninety-five parts, of weight, of minium, and ten parts, of weight, of cake in powder.

We would here state that as we have heretofore made an independent application for a United States Patent for the composition of the packing mass for the plates, we do not in this present application claim the same. This active material, as above described, is brought into the holes or interstices of the lattice-frame by means of a tinned-iron spoon or spattle, and distributed in such a manner that the mass projects about three to four millimeters over the lead frame. The surplus of the material is then beaten by means of a brass bar until a visible sweating of the material is produced, whereupon that part of the mass which projects over the frame is removed by means of a long knife. The lead frame is then turned and the other side of the plate is treated in a similar manner.

In order to obtain a higher degree of hardness of the plates, and principally to prevent the softening and outfalling of the active materials from the plates, we submit them, after drying, to the following treatment: We prepare a bath of sulphuric acid of 1.85 diluted with seventy-five per cent. water in a chest or trough lined with lead. In this bath the plate is rapidly dipped, then quickly taken out, and left to drain. After twenty-four hours the plate is again dipped in the above bath so long until the produced effervescence ceases nearly. In case the bath should become turbid, like milk, around the plates, the latter must immediately be taken out and left to dry. After further twenty-four hours the plates are dipped into the bath for a third time, and left therein without danger for ten to twelve hours. By this treatment the upper layer on both sides of the plates becomes partially converted into sulphate of lead, which stiffens, like cement, and prevents the material from falling out of the interior of the plates. At the same time the minium of the positive-pole plates is converted partially into peroxide of lead, whereby the plates receive a chocolate-like appearance.

In order that our invention may be fully understood, we shall now proceed to describe the same more particularly, reference being made to the accompanying drawings, in which—

Figure 1 represents a longitudinal section of our accumulator. Fig. 2 is a cross-section along the line I II of Fig. 1, and Fig. 3 shows in plan a connecting-piece of the pole-bars.

The lead plates, treated as above described, are placed in a box, A, of wood, lined with sheets B, of lead, of sufficient thickness, soldered with lead, upon which are placed veneer of two to three millimeters thickness impregnated with paraffine. At the bottom of the lead box are arranged four to six small prismatic blocks, C, of wood, likewise impregnated with paraffine. When inserting the plates into the box, the latter is to be inclined under an angle of forty-five degrees, and in each of the corners is fixed a ledge, D, impregnated with paraffine. These ledges are seven millimeters thick and of such a breadth that the plates rest one and one-half to two centimeters breadth on them. Between the above-described ledges are inserted ten to twelve wood staves of a circular section of seven millimeters diameter, and of such a length that they project about one centimeter over the plates. The first negative plate is then pushed into the box, two ledges are placed on the ends of that plate, and ten to twelve staves between the ledges, whereupon a positive-pole plate is placed, and so on. The last plate must be a negative one.

The total number of plates in an accumulator may be conveniently varied, according to the dimensions and application of the accumulator.

In order to retain the plates firm in the box or cell, the plates are slightly pressed together and fastened with strips of cork or of wooden wedges impregnated with paraffine, which are pushed in between the last plate and the wall of the box. It is advisable to insulate the plates by means of paper treated with nitric acid, in order to prevent short circuiting in such cases when particles of the active material should fall out from the plates during their transport. The plates prepared in the before-described manner are so placed in the box that the bars P of the positive pole are directed to one side, and the bars P' of the negative pole to the other side of the accumulator.

In order to prevent as much as possible vaporization of the diluted nitric acid, we cover the accumulator with a sufficiently-thick sheet of lead, F. In the center of this cover we make a circular opening, G, of about seventy to one hundred millimeters diameter, bordered by a tube of lead and closed with a conical-shaped cover, H, for the purpose to allow dropping of the acid splashed up during charging. The opening G serves only for the introduction of the diluted sulphuric acid. The cover-plate F has round holes on both sides corresponding to the number of the positive and negative pole-bars which have to pass through these holes. In the latter are inserted short tubes I, of lead, projecting about one centimeter in length above and below. The pole-bars are coated with tubes K, of india-rubber, in order to insulate the same from the plate of the cover. At one corner of the plate of the cover is soldered a tube, L, of lead, of about two centimeters length, through which the acid may be drawn off from the box by means of a siphon. After the cover has been placed and connected with the lead lining B of the box, the positive and negative pole-bars P P' are suitably connected by bars of lead R, on the ends of which are soldered pieces of tinned-copper wire, which serve as poles and carry the pole-jaws. The accumulator is now filled with sulphuric acid of 1.85 specific gravity diluted with seventy per cent. water, and may be at once submitted to the "formation."

Our improved secondary batteries or accumulators offer the following advantages: (a) The prevention of vaporization of sulphuric acid by the air-tight cover. (b) The use of the positive and negative connecting-rods of lead outside the box protect them against the corrosive action of the sulphuric acid. (c) The use of filtering-paper treated with nitric acid placed between the plates of the accumulator prevents every short circuit in the accumulator. (d) The manufacture of our accumulators is very cheap, in comparison with those now in use, as all the machineries for obtaining the usual high pressure are not necessary.

Having now described and particularly ascertained the nature of our invention, and the manner in which the same is or may be carried into effect, we claim as our invention and desire to secure by Letters Patent—

In the manufacture of secondary batteries or accumulators, the method of fixing the active material in the interstices of the lead plates by simply beating it, instead of pressing it in, by means of a powerful press, as heretofore generally used, and the subsequent treatment with diluted sulphuric acid, all substantially as above set forth.

Signed at Schemnitz, in the Kingdom of Hungary, the 21st day of May, 1886.

STEPHAN FARBAKY.
STEFAN SCHENEK.

Witnesses:
ED. SCHMIDT,
JOH. LUX.